United States Patent
Nagayama et al.

(10) Patent No.: US 9,579,870 B2
(45) Date of Patent: Feb. 28, 2017

(54) WELDED JOINT OF DUPLEX STAINLESS STEEL

(75) Inventors: Hiroyuki Nagayama, Tokyo (JP); Kenta Yamada, Tokyo (JP); Masahiko Hamada, Tokyo (JP); Daisuke Motoya, Tokyo (JP); Hisashi Amaya, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 0 days.

(21) Appl. No.: 13/984,321

(22) PCT Filed: Feb. 10, 2012

(86) PCT No.: PCT/JP2012/053035
§ 371 (c)(1),
(2), (4) Date: Aug. 8, 2013

(87) PCT Pub. No.: WO2012/111535
PCT Pub. Date: Aug. 23, 2012

(65) Prior Publication Data
US 2013/0316193 A1    Nov. 28, 2013

(30) Foreign Application Priority Data
Feb. 14, 2011  (JP) .................................. 2011-028336

(51) Int. Cl.
*B23K 35/30* (2006.01)
*B32B 15/01* (2006.01)
(Continued)

(52) U.S. Cl.
CPC ............ *B32B 15/013* (2013.01); *B23K 9/167* (2013.01); *B23K 9/173* (2013.01);
(Continued)

(58) Field of Classification Search
None
See application file for complete search history.

(56) References Cited

U.S. PATENT DOCUMENTS 4,585,479 A * 4/1986 Aoki et al. ...................... 420/43
4,612,069 A * 9/1986 Rainger .................. C22C 38/42
148/325

(Continued)

FOREIGN PATENT DOCUMENTS

JP    08-120413    5/1996
JP    08-260101    10/1996
(Continued)

*Primary Examiner* — Adam Krupicka
(74) *Attorney, Agent, or Firm* — Clark & Brody

(57) ABSTRACT

A welded joint of duplex stainless steel, which can suppress precipitation σ phase under high heat input welding, is excellent in SCC resistance under high-temperature chloride environments. A weld metal of the welded joint contains, in mass percent, C: at most 0.030%, Si: 0.20 to 1.00%, Mn: at most 8.00%, P: at most 0.040%, S: at most 0.0100%, Cu: at most 2.00%, Ni: 7.00 to 12.00%, Cr: 20.0 to 30.0%, Mo: 1 to 4%, N: 0.100 to 0.350%, sol. Al: at most 0.040%, and O: at most 0.035%, the balance being Fe and impurities. The weld metal satisfies Expressions (1) and (3):

$$2.2Cr + 7Mo + 3Cu > 66 \quad (1)$$

$$Cr + 11Mo + 10Ni - 12(Cu + 30N) < 100 \quad (3)$$

where a content (mass percent) of each element in one of the base metal and weld metal is used for each element in Expressions (1) and (3).

32 Claims, 7 Drawing Sheets

(51) Int. Cl.
  *C22C 38/00* (2006.01)
  *C22C 38/02* (2006.01)
  *C22C 38/04* (2006.01)
  *C22C 38/06* (2006.01)
  *C22C 38/42* (2006.01)
  *C22C 38/44* (2006.01)
  *B23K 9/167* (2006.01)
  *B23K 9/173* (2006.01)

(52) U.S. Cl.
  CPC ...... *B23K 35/3033* (2013.01); *B23K 35/3053* (2013.01); *B32B 15/01* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *B23K 2203/04* (2013.01); *Y10T 428/12972* (2015.01)

(56) References Cited

U.S. PATENT DOCUMENTS

| | | | | |
|---|---|---|---|---|
| 4,816,085 | A | * | 3/1989 | Flasche .............. B23K 35/3086 148/327 |
| 5,254,184 | A | * | 10/1993 | Magee, Jr. .............. C22C 38/58 148/325 |
| 5,298,093 | A | * | 3/1994 | Okamoto ................ C22C 38/44 148/325 |
| 6,042,782 | A | * | 3/2000 | Murata et al. ................. 420/109 |
| 6,159,310 | A | * | 12/2000 | Inoue et al. ................... 148/325 |
| 2008/0138232 | A1 | * | 6/2008 | Kangas .............. B23K 35/3053 420/38 |
| 2009/0098007 | A1 | * | 4/2009 | Tsuge et al. .................... 420/38 |
| 2010/0000281 | A1 | * | 1/2010 | Hirase ...................... C21D 8/10 72/69 |

FOREIGN PATENT DOCUMENTS

| | | |
|---|---|---|
| JP | 2001-009589 | 1/2001 |
| JP | 2001-113388 | 4/2001 |
| JP | 2003-171743 | 6/2003 |
| WO | 96/18751 | 6/1996 |

* cited by examiner

WELDED JOINT OF DUPLEX STAINLESS STEEL

TECHNICAL FIELD

The present invention relates to a welded joint of duplex stainless steel, and, more particularly, to a welded joint of duplex stainless steel including a base metal and a weld metal.

BACKGROUND ART

Oil and natural gas produced from oil fields and gas fields contain associated gas. The associated gas contains corrosive gas such as carbon dioxide gas ($CO_2$) and hydrogen sulfide ($H_2S$). Line pipes transport the associated gas together with the oil and the natural gas. Hence, the line pipes suffer from problems of stress corrosion cracking (SCC), sulfide stress cracking (SSC), and general corrosion that causes a decrease in wall thickness.

The propagation speeds of SCC and SSC are high. Hence, SCC and SSC penetrate through the line pipes in a short time from the occurrence thereof. Moreover, SCC and SSC locally occur. Hence, steel materials for line pipes are required to have an excellent corrosion resistance (a SCC resistance, a SSC resistance, and a general corrosion resistance), and are required to have, particularly, a SCC resistance and a SSC resistance.

WO 96/18751 and JP 2003-171743A each propose a duplex stainless steel excellent in corrosion resistance. The duplex stainless steel according to WO 96/18751 contains 1 to 3% of Cu. WO 96/18751 describes that this increases the corrosion resistance of the duplex stainless steel under chloride and sulfide environments.

A method of producing the duplex stainless steel according to JP 2003-171743A involves properly adjusting the contents of Cr, Ni, Cu, Mo, N, and W and controlling the area fraction of a ferrite phase in the duplex stainless steel to 40 to 70%. JP 2003-171743A describes that this increases the strength, toughness, and seawater corrosion resistance of the duplex stainless steel.

DISCLOSURE OF THE INVENTION

Unfortunately, in the duplex stainless steel disclosed in WO 96/18751, the corrosion resistance of a weld zone easily decreases, and the weld zone easily embrittles, at the time of high heat input welding. Similarly in the duplex stainless steel disclosed in JP 2003-171743A, the corrosion resistance of a weld zone easily decreases, and a heat affected zone (HAZ) of the weld zone easily embrittles, at the time of high heat input welding. Such a decrease in the corrosion resistance of the weld zone and such an embrittlement of the weld zone are caused by a sigma phase ($\sigma$ phase) precipitating in the HAZ at the time of the high heat input welding. The $\sigma$ phase is an intermetallic compound.

In the duplex stainless steel disclosed in JP 2003-171743A, moreover, the SCC resistance is low under high-temperature chloride environments containing the associated gas and having a temperature range of 120 to 200° C.

Moreover, in a welded joint of duplex stainless steel, a weld metal of a weld zone is also required to have a SCC resistance. Moreover, it is not preferable that a $\sigma$ phase precipitate in the weld metal at the time of high heat input welding.

The present invention has an objective to provide a welded joint of duplex stainless steel including a base metal and a weld metal that can suppress precipitation of a $\sigma$ phase at the time of high heat input welding and are excellent in SCC resistance under high-temperature chloride environments.

A welded joint of duplex stainless steel according to the present invention includes: a base metal; and a weld metal. The base metal contains, in mass percent, C: at most 0.030%, Si: 0.20 to 1.00%, Mn: at most 8.00%, P: at most 0.040%, S: at most 0.0100%, Cu: more than 2.00% and at most 4.00%, Ni: 4.00 to 8.00%, Cr: 20.0 to 30.0%, Mo: 0.50 to 2.00%, N, 0.100 to 0.350%, and sol. Al: at most 0.040%, the balance being Fe and impurities, and the base metal satisfies Expression (1) and Expression (2). The weld metal contains, in mass percent, C: at most 0.030%, Si: 0.20 to 1.00%, Mn: at most 8.00%, P: at most 0.040%, S: at most 0.010%, Cu: at most 2.00%, Ni: 7.00 to 12.00%, Cr: 20.0 to 30.0%, Mo: 1.00 to 4.00%, N, 0.100 to 0.350%, sol. Al: at most 0.040%, and 0: at most 0.035%, the balance being Fe and impurities, and the weld metal satisfies Expression (1) and Expression (3):

$$2.2Cr+7Mo+3Cu>66 \tag{1}$$

$$Cr+11Mo+10Ni-12(Cu+30N)<0 \tag{2}$$

$$Cr+11Mo+10Ni-12(Cu+30N)<100 \tag{3}$$

where a content (mass percent) of each element in one of the base metal and the weld metal is substituted into a symbol of each element in Expression (1) to Expression (3).

The base metal and the weld metal of the welded joint of duplex stainless steel according to the present invention can suppress precipitation of a $\sigma$ phase at the time of high heat input welding and are excellent in SCC resistance under high-temperature chloride environments.

DESCRIPTION OF EMBODIMENTS

Hereinafter, an embodiment of the present invention is described in detail with reference to the drawings. Hereinafter, "%" in the content of an element means mass percent.

The inventors of the present invention carried out various experiments and detailed studies on a base metal and a weld metal of a welded joint of duplex stainless steel to obtain the following findings.

[Base Metal]

(a) In order to suppress precipitation of a σ phase at the time of high heat input welding, it is necessary to reduce the Cr content and the Mo content. However, molybdenum (Mo) strengthens a passive film containing chromium (Cr) as its major ingredient, and increases the SCC resistance of a duplex stainless steel. Accordingly, if the Cr content and the Mo content are low under high-temperature chloride environments containing carbon dioxide gas and hydrogen sulfide and having an atmospheric temperature of 120° C. to 200° C., the base metal of the welded joint of duplex stainless steel may not be provided with an excellent SCC resistance.

(b) Cu decreases the corrosion speed of a steel material under high-temperature chloride environments. Accordingly, if the Cr content and the Mo content are suppressed to be low while Cu is contained, the passive film can be strengthened.

Figure 1:
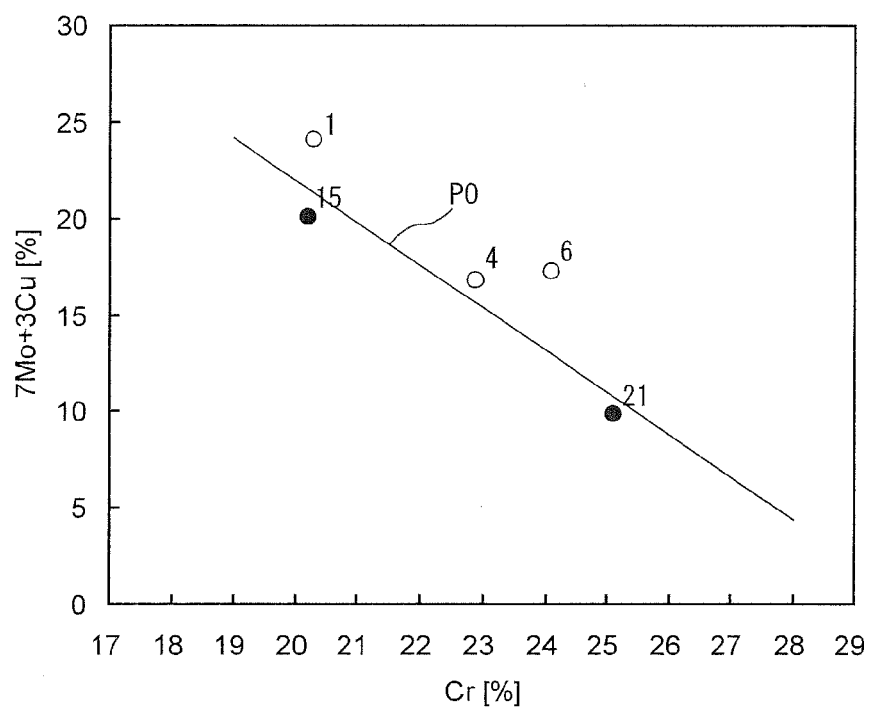
FIG. 1 is a graph showing a relation between: the Cr content, the Mo content, and the Cu content; and the SCC resistance of a base metal of a welded joint of duplex stainless steel.

FIG. 1 is a graph showing the SCC resistance of each base metal of the welded joint of duplex stainless steel to the Cr content, the Mo content, and the Cu content. FIG. 1 is obtained according to an examination method of Example 1 to be described later. The ordinate of FIG. 1 represents a "7Mo+3Cu" value. The "7Mo+3Cu" value is obtained on the basis of the Mo content and the Cu content of the base metal. Specifically, the Mo content (mass percent) and the Cu content (mass percent) of the corresponding base metal are respectively substituted into "Mo" and "Cu" in "7Mo+3Cu". The abscissa of FIG. 1 represents the Cr content (mass percent) of the base metal. "○" marks of a plurality of marks in FIG. 1 represent that SCC did not occur in the base metal during a SCC test described in Example 1. "●" marks therein represent that SCC occurred. A number given to the upper right of each mark corresponds to a base metal number in Table 1 in Example 1 to be described later. That is, each mark represents a result of the SCC test on the base metal having each base metal number in Table 1.

With reference to FIG. 1, SCC did not occur in the base metals with the marks located above a straight line P0 defined by 7Mo+3Cu=−2.2Cr+66. In comparison, SCC occurred in the base metals with the marks located below the straight line P0.

From the result described above, if the base metal of the welded joint of duplex stainless steel satisfies Expression (1), the passive film is strengthened, and the SCC resistance is improved:

$$2.2Cr+7Mo+3Cu>66 \quad (1)$$

where the content (mass percent) of each element in the steel is substituted into the symbol of each element in Expression (1).

(c) In the case where the Cu content is equal to or less than 2.00%, a sufficient corrosion resistance (a SCC resistance, a SSC resistance, and a general corrosion resistance) cannot be obtained. Accordingly, the Cu content needs to be more than 2.00%.

(d) When the base metal is welded, a heat affected zone (HAZ) thereof is heated in a short time, and then is cooled. The σ phase more easily precipitates in such a HAZ. In order to suppress the precipitation of the σ phase, it is preferable to suppress the nucleation and nuclear growth of the σ phase.

(e) As the Ni content increases, the driving force of the nucleation of the σ phase increases. Accordingly, in order to suppress the nucleation of the σ phase, Ni should not be contained. However, if Ni is not contained, the toughness of the base metal and the corrosion resistance (including the SCC resistance) thereof decrease. Accordingly, in order to suppress the decrease in the toughness and corrosion resistance of the base metal while suppressing the precipitation of the σ phase, it is preferable to adjust the Ni content in accordance with the Cu content and the N content. Specifically, if the base metal satisfies Expression (2), the decrease in the toughness and corrosion resistance of the base metal is suppressed, while the precipitation of the σ phase is suppressed:

$$Cr+11Mo+10Ni-12(Cu+30N)<0 \quad (2)$$

where the content (mass percent) of each element in the steel is substituted into the symbol of each element in Expression (2).

"Cr+11Mo+10Ni" in Expression (2) represents the magnitude of the precipitation driving force of the σ phase. In the duplex stainless steel, Cr, Mo, and Ni increase the driving force of the nucleation of the σ phase precipitation. The contribution ratio of the Mo content to the precipitation driving force of the σ phase is 11 times that of the Cr content. The contribution ratio of the Ni content to the precipitation driving force of the σ phase is 10 times that of the Cr content.

Meanwhile, "12(Cu+30N)" in Expression (2) represents the magnitude of the precipitation inhibiting force of the σ phase. The contribution ratio of the Cu content to the precipitation inhibiting force of the σ phase corresponds to 12 times the contribution ratio of the Cr content to the precipitation driving force of the σ phase. The contribution ratio of the N content to the precipitation inhibiting force of the σ phase corresponds to 30 times the contribution ratio of the Cu content.

The reason why Cu and N suppress the σ phase precipitation is estimated as follows. A boundary plane between ferrite and austenite (hereinafter, referred to as ferrite/austenite boundary plane) is a nucleation site of the σ phase. When a Cu atom or a N atom is placed in the vicinity of a Ni atom placed in a crystal lattice, a decrease in interfacial energy on the ferrite/austenite boundary plane is suppressed. If the decrease in interfacial energy is suppressed, the amount of decrease in free energy at the time of the σ phase precipitation becomes smaller. Hence, the driving force of the nucleation of the σ phase becomes smaller.

Moreover, Cu extremely finely precipitates as a Cu concentrated phase in a matrix. The precipitated Cu is dispersed in the matrix. The precipitated Cu can be a nucleation site of the σ phase. The large amount of Cu dispersed and precipitated in the matrix competes with the ferrite/austenite boundary plane that is the original nucleation site of the σ phase. The nuclear growth of the σ phase on the ferrite/austenite boundary plane is faster than the nuclear growth of the σ phase on the dispersed and precipitated Cu. Accordingly, the nuclear growth of the σ phase on the ferrite/austenite boundary plane is delayed by the dispersed and precipitated Cu, so that the precipitation of the σ phase is suppressed.

(f) If the Ni content satisfies Expression (2), a Cu atom and a N atom are easily placed in the vicinity of a Ni atom placed in a crystal lattice. Hence, the nucleation of the σ phase is suppressed.

[Weld Metal]

Figure 2:
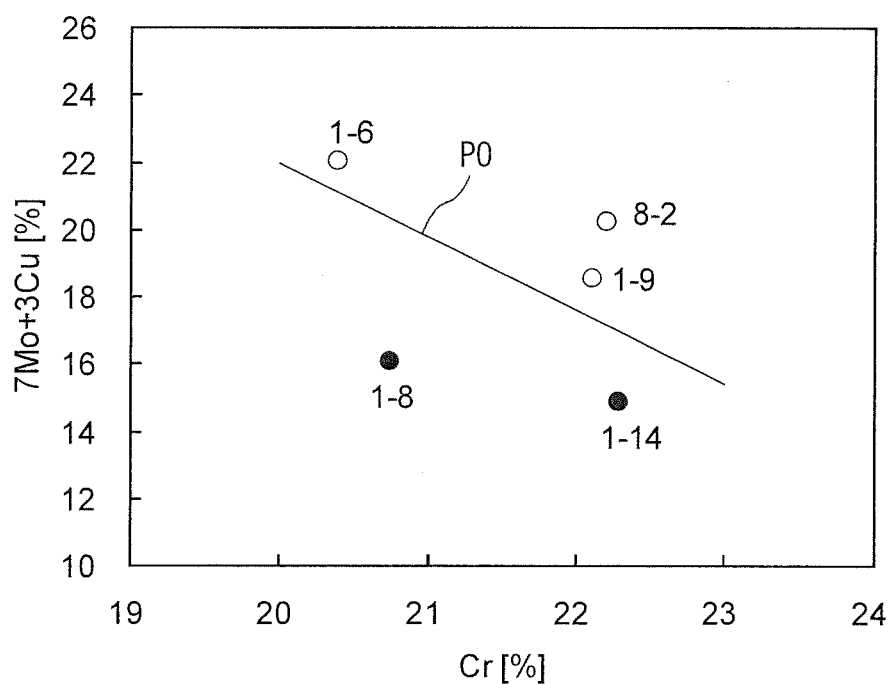
FIG. 2 is a graph showing a relation between: the Cr content, the Mo content, and the Cu content; and the SCC resistance of a weld metal of the welded joint of duplex stainless steel.

(g) Similarly to the base metal, if the weld metal satisfies Expression (1), an excellent SCC resistance can be obtained. FIG. 2 is a graph showing a relation between a "7Mo(%)+3Cu(%)" value and a "Cr(%)" value in the weld metal. FIG. 2 is obtained according to an examination method of Example 2 to be described later. "◯" marks in FIG. 2 represent that SCC did not occur in the weld metal during a SCC test in Example 2. "●" marks therein represent that SCC occurred. A number given to the upper right of each mark corresponds to a joint number in Table 3 in Example 2.

With reference to FIG. 2, SCC did not occur similarly in the weld metals with the marks located above the straight line P0 defined by 7Mo+3Cu=−2.2Cr+66. In comparison, SCC occurred in the weld metals with the marks located below the straight line P0. From the result described above, if the weld metal satisfies Expression (1), the passive film of the weld metal is strengthened, so that the SCC resistance is improved.

(h) The σ phase precipitation susceptibility of the weld metal is lower than that of the base metal (HAZ). In other words, the σ phase precipitates less easily in the weld metal than in the base metal. The reason therefor is estimated as follows. Solution treatment is performed on the base metal before welding. Cr, Ni, and Mo in the steel are sufficiently diffused by the solution treatment. Hence, the base metal is in the state where element diffusion for the nucleation of the σ phase advances. Accordingly, if heat is added to the base metal by high heat input welding, the element diffusion in the steel further advances, and the σ phase more easily precipitates. Meanwhile, the weld metal once melts and solidifies at the time of the high heat input welding. An influence of the preceding heat treatment on the weld metal is eliminated by the melting. Hence, the σ phase precipitation susceptibility of the weld metal is lower than that of the base metal. From the above, if the weld metal satisfies the following Expression (3) instead of Expression (2), the occurrence of the σ phase at the time of the high heat input welding can be suppressed.

$$Cr+11Mo+10Ni-12(Cu+30N)<100 \quad (3)$$

where the content (mass percent) of each element in the steel is substituted into the symbol of each element in Expression (3).

(i) In the case where the weld metal is formed using a similar composition metal to the base metal of the present invention, the Cu content is excessively high, and hence high-temperature cracking more easily occurs. Accordingly, the Cu content of the weld metal of the present invention is set to be lower than that of the base metal.

(j) In the case where the weld metal is formed using a similar composition metal to the base metal of the present invention, it is difficult to adjust the phase ratio of ferrite and austenite (hereinafter, simply referred to as "phase ratio") in the weld metal. Because the weld metal has a molten and solidified structure, heat treatment such as solution treatment cannot be performed thereon. Hence, the phase ratio adjustment of the weld metal is more difficult than that of the base metal. Accordingly, the Ni content whose phase ratio can be appropriately controlled is set to be higher in the weld metal than in the base metal.

On the basis of the above findings, the welded joint of duplex stainless steel according to the present invention is completed. Hereinafter, the welded joint of duplex stainless steel according to the present invention is described.

The welded joint of duplex stainless steel includes a base metal and a weld metal. The welded joint of duplex stainless steel is formed by welding, for example, an end of one steel pipe (or one steel plate) to an end of another steel pipe (or another steel plate). The steel pipes may be seamless steel pipes, and may be welded steel pipes. Hereinafter, the base metal and the weld metal are described in detail.

[Base Metal]

The base metal of the welded joint of duplex stainless steel according to the present invention has the following chemical composition.

C: 0.030% or less

Carbon (C) stabilizes austenite. Meanwhile, if C is excessively contained, carbides more easily precipitate, and the corrosion resistance decreases. Accordingly, the C content is equal to or less than 0.030%. The upper limit of the C content is preferably 0.025% and more preferably 0.020%.

Si: 0.20 to 1.00%

Silicon (Si) suppresses a decrease in the flowability of molten metal at the time of welding, and suppresses the occurrence of a weld defect. Meanwhile, if Si is excessively contained, an intermetallic compound typified by the σ phase is more easily produced. Accordingly, the Si content is 0.20 to 1.00%. The upper limit of the Si content is preferably 0.80% and more preferably 0.60%. The lower limit of the Si content is preferably 0.25% and more preferably 0.30%.

Mn: 8.00% or less

Manganese (Mn) is an essential element. Mn desulfurizes and deoxidizes the steel, and increases the hot workability of the steel. Moreover, Mn increases the solubility of nitrogen (N). Meanwhile, if Mn is excessively contained, the corrosion resistance decreases. Accordingly, the Mn content is equal to or less than 8.00%. The upper limit of the Mn content is preferably 7.50% and more preferably 5.00%. The lower limit of the Mn content is preferably 0.03% and more preferably 0.05%.

P: 0.040% or less

Phosphorus (P) is an impurity. P decreases the corrosion resistance and toughness of the steel. Accordingly, it is preferable that the P content be low. The P content is equal to or less than 0.040%. The P content is preferably equal to or less than 0.030% and more preferably equal to or less than 0.025%.

S: 0.0100% or less

Sulfur (S) is an impurity. S decreases the hot workability of the steel. Moreover, S forms sulfides. The sulfides become pitting occurrence origins, and thus decrease the pitting resistance of the steel. Accordingly, it is preferable that the S content be low. The S content is equal to or less than 0.0100%. The S content is preferably equal to or less than 0.0050% and more preferably equal to or less than 0.0020%.

Cu: More than 2.00% and Equal to or less than 4.00%

Copper (Cu) strengthens a passive film, and increases the corrosion resistance including the SCC resistance, under high-temperature chloride environments. Moreover, Cu extremely finely precipitates in the base metal at the time of high heat input welding, and suppresses the precipitation of the σ phase at the ferrite/austenite phase boundary. Meanwhile, if Cu is excessively contained, the hot workability of the steel decreases. Accordingly, the Cu content is more than 2.00% and equal to or less than 4.00%.

Ni: 4.00 to 8.00%

Nickel (Ni) stabilizes austenite. Moreover, Ni increases the toughness of the steel, and increases the corrosion resistance including the SCC resistance of the steel. Meanwhile, if Ni is excessively contained, an intermetallic compound typified by the σ phase is more easily produced.

Accordingly, the Ni content is 4.00 to 8.00%. The lower limit of the Ni content is preferably 4.50% and more preferably 5.00%.

Cr: 20.0 to 30.0%

Chromium (Cr) increases the corrosion resistance of the steel, and particularly increases the SCC resistance of the steel under high-temperature chloride environments. Meanwhile, if Cr is excessively contained, an intermetallic compound typified by the σ phase is produced. Hence, the weldability of the steel decreases, and the hot workability thereof decreases. Accordingly, the Cr content is 20.0 to 30.0%. The lower limit of the Cr content is preferably 21.0% and more preferably 22.0%. The upper limit of the Cr content is preferably 29.0% and more preferably 28.0%.

Mo: 0.50 to 2.00%

Molybdenum (Mo) increases the SCC resistance of the steel. Meanwhile, if Mo is excessively contained, an intermetallic compound typified by the σ phase is produced. Hence, the weldability of the steel decreases, and the hot workability thereof decreases. Accordingly, the Mo content is 0.50 to 2.00%. The lower limit of the Mo content is preferably 0.60%.

N: 0.100 to 0.350%

Nitrogen (N) is a strong austenite forming element, and increases the thermal stability and corrosion resistance of the steel. The base metal of the welded joint of duplex stainless steel according to the present invention contains Cr and Mo that are ferrite forming elements. If the balance of the amount of ferrite and the amount of austenite in the base metal is taken into consideration, the N content is equal to or more than 0.100%. Meanwhile, if N is excessively contained, blowholes that are weld defects occur. If N is excessively contained, moreover, nitrides are more easily produced at the time of welding, and the toughness and corrosion resistance of the steel decrease. Accordingly, the N content is 0.100 to 0.350%. The lower limit of the N content is preferably 0.130% and more preferably 0.160%.

Sol. Al: 0.040% or less

Aluminum (Al) is an essential element. Al deoxidizes the steel. Meanwhile, if Al is excessively contained, aluminum nitride (AlN) is formed, and the toughness and corrosion resistance of the steel decrease. Accordingly, the Al content is equal to or less than 0.040%. The Al content herein means the content of acid-soluble Al (sol. Al).

The upper limit of the Al content is preferably 0.035% and more preferably 0.030%. The lower limit of the Al content is preferably 0.003% and more preferably 0.005%.

The balance of the base metal consists of Fe and impurities. The impurities in this context mean elements mixed in for ores and scraps used as raw materials for the steel or various factors in a production process. Note that tungsten (W) is an impurity in the base metal according to the present invention. W promotes the production of the σ phase. Moreover, W produces carbides. The σ phase and the W carbides decrease the toughness of the steel. Hence, W is an impurity in the base metal according to the present invention. Specifically, the W content is equal to or less than 0.1%.

[With regard to Expression (1) and Expression (2)]

Moreover, the base metal satisfies Expression (1) and Expression (2):

$$2.2Cr+7Mo+3Cu>66 \quad (1)$$

$$Cr+11Mo+10Ni-12(Cu+30N)<0 \quad (2)$$

where the content (mass percent) of each element in the steel is substituted into the symbol of each element in Expression (1) and Expression (2).

[With regard to Expression (1)]

In the base metal, the Cr content and the Mo content are restricted in order to suppress the precipitation of the σ phase. Accordingly, it is preferable that a proper amount of Cu be contained, in order to strengthen a passive film.

It is defined that F1=2.2Cr+7Mo+3Cu. In the case where F1 is equal to or less than 66, the SCC resistance is low under high-temperature chloride environments. If F1 is more than 66, a sufficiently excellent SCC resistance can be obtained even under high-temperature chloride environments.

[With regard to Expression (2)]

As described above, "Cr+11Mo+10Ni" in Expression (2) represents the magnitude of the precipitation driving force of the σ phase. "12(Cu+30N)" therein represents the magnitude of the precipitation inhibiting force of the σ phase.

It is defined that F2=Cr+11Mo+10Ni−12(Cu+30N). In the case where F2 is less than 0, that is, in the case where Expression (2) is satisfied, the precipitation inhibiting force of the σ phase is larger than the precipitation driving force of the σ phase. Hence, it is possible to sufficiently suppress the σ phase from precipitating at the ferrite/austenite phase boundary at the time of high heat input welding.

The base metal may contain, instead of Fe, one or more types of element selected from at least one group of the following first group to third group. That is, the elements in the first group to the third group are selective elements that can be contained as needed.

First group: V: 1.50% or less

Second group: Ca: 0.0200% or less, Mg: 0.0200% or less, and B: 0.0200% or less

Third group: rare earth metal (REM): 0.2000% or less

Hereinafter, these selective elements are described in detail.

[First Group]

V: 1.50% or less

Vanadium (V) is a selective element. V increases the corrosion resistance of the steel, and particularly increases the corrosion resistance under acid environments. More specifically, if V is contained together with Mo and Cu, the crevice corrosion resistance of the steel increases. Meanwhile, if V is excessively contained, the amount of ferrite in the steel excessively increases, and the corrosion resistance of the steel decreases. Accordingly, the V content is equal to or less than 1.50%, and the upper limit of the V content is preferably 1.30%. If the V content is equal to or more than 0.05%, the above-mentioned effect can be remarkably obtained. However, even if the V content is less than 0.05%, the above-mentioned effect can be obtained to some extent.

[Second Group]

Ca: 0.0200% or less

Mg: 0.0200% or less

B: 0.0200% or less

Calcium (Ca), magnesium (Mg), and boron (B) are selective elements. Ca, Mg, and B immobilize S and O (oxygen) in the steel, and increase the hot workability of the steel. The S content of the base metal is low. Accordingly, even if Ca, Mg, and B are not contained, the hot workability of the steel is high. However, for example, in the case where a seamless steel pipe is produced according to a skew rolling method, a higher hot workability may be required. If one or more types selected from the group consisting of Ca, Mg, and B are contained, a higher hot workability can be obtained.

Meanwhile, if one or more types of Ca, Mg, and V are excessively contained, non-metallic inclusions (such as oxides and sulfides of Ca, Mg, and B) increase. The non-metallic inclusions become pitting origins, and thus decrease the corrosion resistance of the steel. Accordingly, the Ca content is equal to or less than 0.0200%, the Mg content is equal to or less than 0.0200%, and the B content is equal to or less than 0.0200%.

In order to remarkably obtain the above-mentioned effect, it is preferable that the content of at least one type of Ca, Mg, and B or the total content of two or more types thereof be equal to or more than S (mass percent)+½×O (mass percent). However, if one or more types of Ca, Mg, and B are contained even a little, the above-mentioned effect can be obtained to some extent.

In the case where two types of Ca, Mg, and B are contained, the total content of these elements is equal to or less than 0.04%. In the case where all of Ca, Mg, and B are contained, the total content of these elements is equal to or less than 0.06%.

[Third Group]

Rare earth metal (REM): 0.2000% or less

Rare earth metal (REM) is a selective element. Similarly to Ca, Mg, and B, REM immobilizes S and O (oxygen) in the steel, and increases the hot workability of the steel. Meanwhile, if REM is excessively contained, non-metallic inclusions (such as oxides and sulfides of rare earth metal) increase, and the corrosion resistance of the steel decreases. Accordingly, the REM content is equal to or less than 0.2000%. In order to remarkably obtain the above-mentioned effect, it is preferable that the REM content be equal to or more than S (mass percent)+½×O (mass percent). However, if REM is contained even a little, the above-mentioned effect can be obtained to some extent.

REM is a collective term including 15 elements of lanthanoid, Y, and Sc. One or more types of these elements are contained. The REM content means the total content of one or more types of these elements.

[Weld Metal]

The weld metal of the welded joint of duplex stainless steel according to the present invention has the following chemical composition.

C: 0.030% or less

Carbon (C) stabilizes austenite in the weld metal. Meanwhile, if C is excessively contained, carbides more easily precipitate, and the corrosion resistance decreases. Accordingly, the C content is equal to or less than 0.030%. The upper limit of the C content is preferably 0.025% and more preferably 0.020%.

Si: 0.20 to 1.00%

Silicon (Si) deoxidizes molten metal at the time of welding. Moreover, Si increases the strength of the weld metal. Meanwhile, if Si is excessively contained, the toughness of the weld metal decreases. Accordingly, the Si content is 0.20 to 1.00%. The upper limit of the Si content is preferably 0.80% and more preferably 0.60%. The lower limit of the Si content is preferably 0.25% and more preferably 0.30%.

Mn: 8.00% or less

Manganese (Mn) is an essential element. Mn deoxidizes molten metal at the time of welding. Moreover, Mn increases the strength of the weld metal. Meanwhile, if Mn is excessively contained, the corrosion resistance of the weld metal decreases. Accordingly, the Mn content is equal to or less than 8.00%. The upper limit of the Mn content is preferably 7.00% and more preferably 6.00%. The lower limit of the Mn content is preferably 0.25% and more preferably 0.50%.

P: 0.040% or less

Phosphorus (P) is an impurity. P decreases the toughness of the weld metal, and increases the high-temperature cracking susceptibility of the weld metal. Accordingly, it is preferable that the P content be low. The P content is equal to or less than 0.040%. The P content is preferably equal to or less than 0.030% and more preferably equal to or less than 0.020%.

S: 0.010% or less

Sulfur (S) is an impurity. S decreases the ductility and corrosion resistance of the weld metal, and increases the high-temperature cracking susceptibility of the weld metal. Accordingly, it is preferable that the S content be low. The S content is equal to or less than 0.010%. The S content is preferably equal to or less than 0.005% and more preferably equal to or less than 0.002%.

Cu: 2.00% or less

Copper (Cu) is an essential element. Cu strengthens a passive film, and increases the corrosion resistance including the SCC resistance, under high-temperature chloride environments. Meanwhile, if Cu is excessively contained, the high-temperature cracking susceptibility of the weld metal increases. Accordingly, the Cu content is equal to or less than 2.00%. The Cu content is preferably less than 2.00%. The upper limit of the Cu content is preferably 1.00% and more preferably 0.80%. The lower limit of Cu is preferably 0.10% and more preferably 0.15%.

Ni: 7.00 to 12.00%

Nickel (Ni) stabilizes austenite in the weld metal, and increases the toughness of the weld metal. Meanwhile, if Ni is excessively contained, the amount of ferrite in the weld metal excessively decreases, and basic mechanical properties of the duplex stainless steel become more difficult to obtain. If Ni is excessively contained, moreover, the σ phase more easily precipitates. Accordingly, the Ni content is 7.00 to 12.00%. The upper limit of the Ni content is preferably 11.00% and more preferably 10.00%. The lower limit of the Ni content is preferably 8.00% and more preferably more than 8.00%.

Cr: 20.0 to 30.0%

Chromium (Cr) increases the corrosion resistance of the weld metal, and particularly increases the SCC resistance of the weld metal under high-temperature chloride environments. Meanwhile, if Cr is excessively contained, the σ phase more easily precipitates. Accordingly, the Cr content is 20.0 to 30.0%. The upper limit of the Cr content is preferably 29.0% and more preferably 28.0%. The lower limit of the Cr content is preferably 21.0%.

Mo: 1.00 to 4.00%

Molybdenum (Mo) increases the SCC resistance of the weld metal under high-temperature chloride environments. Meanwhile, if Mo is excessively contained, the σ phase more easily precipitates in the weld metal. Accordingly, the Mo content is 1.00 to 4.00%. The upper limit of the Mo content is preferably 3.50% and more preferably 3.00%. The lower limit of the Mo content is preferably 1.50% and more preferably 2.00%.

N: 0.100 to 0.350%

Nitrogen (N) is a strong austenite forming element, and increases the corrosion resistance of the weld metal. Meanwhile, if N is excessively contained, blowholes that are weld defects occur. Accordingly, the N content is 0.100 to 0.350%. The upper limit of the N content is preferably 0.300% and more preferably 0.250%.

Sol. Al: 0.040% or less

Aluminum (Al) is an essential element. Al deoxidizes molten metal at the time of welding. Meanwhile, if Al is excessively contained, Al forms coarse oxide inclusions, and decreases the toughness of the weld metal. Accordingly, the Al content is equal to or less than 0.040%. The Al content herein means the content of acid-soluble Al (sol. Al).

The upper limit of the Al content is preferably 0.035% and more preferably 0.030%. The lower limit of the Al content is preferably 0.003%.

O (oxygen): 0.035% or less

Oxygen (O) is an impurity. O forms oxide inclusions, and decreases the toughness of the weld metal. Accordingly, it is preferable that the O content be as low as possible. The O content is equal to or less than 0.035%. The upper limit of the O content is preferably 0.030% and more preferably 0.025%.

The balance of the weld metal according to the present invention consists of Fe and impurities. The impurities in this context mean ores and scraps used as raw materials for the steel or elements mixed in for various factors in a production process.

Moreover, the weld metal according to the present invention satisfies Expression (1) and Expression (3):

$$2.2Cr+7Mo+3Cu>66 \quad (1)$$

$$Cr+11Mo+10Ni-12(Cu+30N)<100 \quad (3)$$

where the content (mass percent) of each element in the steel is substituted into the symbol of each element in Expression (1) and Expression (3).

[With regard to Expression (1)]

If F1 (=2.2Cr+7Mo+3Cu) is more than 66, a sufficiently excellent SCC resistance can be obtained even under high-temperature chloride environments, for the same reason as that of the base metal.

[With regard to Expression (3)]

As described above, the σ phase precipitation susceptibility of the weld metal is lower than that of the base metal. Solution treatment is performed on the base metal before welding. Cr, Ni, and Mo in the steel are sufficiently diffused by the solution treatment. Hence, the base metal is in the state where element diffusion for the nucleation of the σ phase advances. Accordingly, if heat is added to the base metal by high heat input welding, the element diffusion in the steel further advances, and the σ phase more easily precipitates. Meanwhile, the weld metal once melts and solidifies at the time of the high heat input welding. An influence of the preceding heat treatment on the weld metal is eliminated by the melting. Hence, the σ phase precipitation susceptibility of the weld metal is lower than that of the base metal.

If F2 (=Cr+11Mo+10Ni−12(Cu+30N)) is less than 100, the precipitation inhibiting force of the a phase in molten metal is larger than the precipitation driving force of the σ phase therein. Hence, it is possible to sufficiently suppress the σ phase from precipitating in the molten metal at the time of high heat input welding.

The weld metal may further contain W, instead of Fe. That is, W is a selective element.

W: 4.00% or less

Tungsten (W) is a selective element. W increases the corrosion resistance of the weld metal, and particularly increases the corrosion resistance under acid environments. More specifically, W increases the pitting resistance of the weld metal. Meanwhile, if W is excessively contained, an effect of improving the corrosion resistance is saturated. If W is excessively contained, moreover, adjustment of the strength of the weld metal becomes difficult. Accordingly, the W content is equal to or less than 4.00%. If the W content is equal to or more than 1.00%, the above-mentioned effect can be remarkably obtained. However, even if the W content is less than 1.00%, the above-mentioned effect can be obtained to some extent. The upper limit of the W content is preferably 3.00% and more preferably 2.00%.

[Production Method]

The duplex stainless steel (base metal) having the above-mentioned chemical composition is molten. The duplex stainless steel may be molten using an electric furnace, and may be molten using an Ar—$O_2$ gaseous mixture bottom blowing decarburization furnace (AOD furnace). Alternatively, the duplex stainless steel may be molten using a vacuum decarburization furnace (VOD furnace). The molten duplex stainless steel may be formed into an ingot according to an ingot-making process, and may be formed into a cast piece (a slab, a bloom, or a round billet) according to a continuous casting process.

The base metal is produced using the produced ingot or cast piece. Examples of the base metal include a steel plate and a seamless steel pipe.

The steel plate is produced according to, for example, the following method. Hot working is performed on the produced ingot or slab, whereby the steel plate is produced. Examples of the hot working include hot forging and hot rolling.

The steel pipe is produced according to, for example, the following method. Hot working is performed on the produced ingot, slab, or bloom, whereby a round billet is produced. Hot working is performed on the produced round billet, whereby a duplex stainless steel pipe is produced. Examples of the hot working include piercing-rolling according to a Mannesmann process. Hot extrusion may be performed as the hot working, and hot forging may be performed thereas.

Solution treatment is performed on the produced base metal. Specifically, the base metal is housed in a heat treatment furnace, and is soaked at a well-known solution treatment temperature (900 to 1,200° C.). After the soaking, the base metal is rapidly cooled by water-cooling or the like.

The base metal remains in a solution state (so-called as-solution-treated material). That is, after the solution treatment, the base metal is used without performing thereon other heat treatment and other cold working (cold drawing and Pilger rolling) than cold straightening.

A weld material for the weld metal is molten in the same manner as that of the base metal described above. The molten weld material is cast to be formed into an ingot. Hot working is performed on the ingot, whereby the weld material is produced. The weld material may be in the shape of a rod, and may be in the shape of a small block.

The base metal is welded using the weld material according to a well-known welding method, whereby a welded joint of duplex stainless steel is produced. Examples of the welding method include tungsten inert gas welding, metal inert gas welding, metal active gas welding, and submerged arc welding. At the time of the welding, the weld material and part of the base metal melt and solidify, whereby the weld metal is formed.

In the case where the welded joint of duplex stainless steel is a welded steel pipe, for example, bending work is performed on the above-mentioned plate-shaped base metal, to be thereby formed into an open pipe. Both the end faces in the longitudinal direction of the open pipe are welded according to a well-known welding method, whereby the welded steel pipe is produced.

EXAMPLE 1

Duplex stainless steels (corresponding to the base metal of the present invention) having various chemical compositions were molten. A plurality of duplex stainless steel plates were produced using the molten duplex stainless steels according to various production conditions. Welded joints were produced using the steel plates, and characteristics (the SCC resistance and whether or not the σ phase precipitated at the time of high heat input welding) of the HAZs of the base metals were examined.

[Examination Method]

Duplex stainless steels having chemical compositions with base metal numbers 1 to 27 shown in Table 1 were molten using a vacuum furnace having a capacity of 150 kg.

(25° C.) whereby steel plates under test with the base metal numbers 1 to 27 were produced.

[Making of Specimens]

Figure 3A:
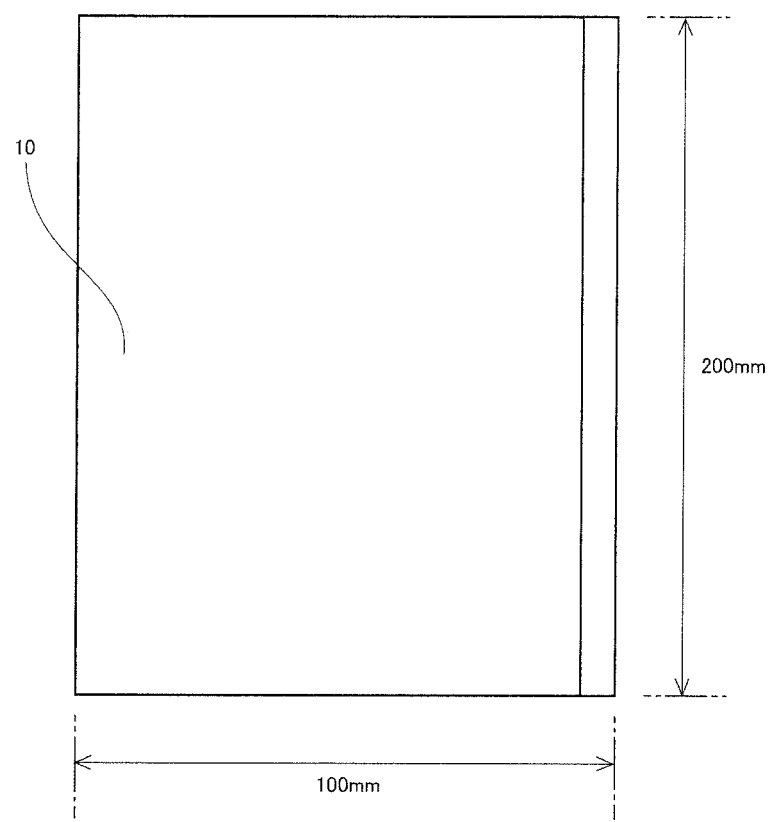
FIG. 3A is a plan view of a plate material made in Example 1.
Figure 3B:
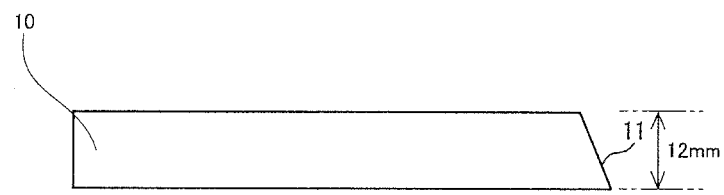
FIG. 3B is a front view of the plate material illustrated in FIG. 3A.

Two plate materials (base metals) 10 illustrated in FIG. 3A and FIG. 3B were made from each steel plate under test. FIG. 3A is a plan view of the plate material 10, and FIG. 3B is a front view thereof. In FIG. 3A and FIG. 3B, numerical values with "mm" represent dimensions (the unit is millimeter).

As illustrated in FIG. 3A and FIG. 313, the plate material 10 had a thickness of 12 mm, a width of 100 mm, and a

TABLE 1

| | Base Material Number | Chemical Composition (the unit is mass percent, and the balance consists of Fe and impurities) | | | | | | | | | | |
|---|---|---|---|---|---|---|---|---|---|---|---|---|
| | | C | Si | Mn | P | S | Cu | Ni | Cr | Mo | N | Sol. Al | Others |
| Examples of Present Invention | 1 | 0.015 | 0.50 | 1.51 | 0.010 | 0.0008 | 3.41 | 4.21 | 20.3 | 1.98 | 0.152 | 0.020 | — |
| | 2 | 0.015 | 0.50 | 1.50 | 0.015 | 0.0010 | 2.92 | 5.50 | 22.1 | 1.95 | 0.211 | 0.020 | 0.15V |
| | 3 | 0.015 | 0.50 | 1.48 | 0.014 | 0.0007 | 2.08 | 4.51 | 23.2 | 1.97 | 0.181 | 0.020 | 0.07V |
| | 4 | 0.015 | 0.50 | 1.55 | 0.014 | 0.0008 | 3.15 | 5.09 | 22.9 | 1.05 | 0.156 | 0.020 | — |
| | 5 | 0.015 | 0.50 | 1.52 | 0.016 | 0.0011 | 2.20 | 4.08 | 23.9 | 1.96 | 0.192 | 0.020 | 0.06V—0.0015Ca |
| | 6 | 0.021 | 0.42 | 1.53 | 0.017 | 0.0005 | 2.12 | 5.19 | 24.1 | 1.55 | 0.210 | 0.022 | — |
| | 7 | 0.017 | 0.51 | 1.52 | 0.012 | 0.0004 | 2.51 | 7.82 | 25.2 | 1.02 | 0.305 | 0.013 | 0.0200Mg |
| | 8 | 0.014 | 0.52 | 0.97 | 0.021 | 0.0002 | 2.44 | 5.03 | 25.0 | 1.10 | 0.189 | 0.014 | 0.0023B—0.0023Ca |
| | 9 | 0.017 | 0.51 | 1.03 | 0.011 | 0.0008 | 3.24 | 5.19 | 24.9 | 1.02 | 0.215 | 0.013 | 0.0005B |
| | 10 | 0.015 | 0.50 | 1.03 | 0.014 | 0.0006 | 2.07 | 5.22 | 26.0 | 0.51 | 0.228 | 0.014 | 0.0012REM |
| | 11 | 0.016 | 0.50 | 1.03 | 0.015 | 0.0009 | 2.15 | 5.22 | 27.1 | 0.50 | 0.202 | 0.014 | 0.08V—0.0008B |
| | 12 | 0.016 | 0.50 | 1.02 | 0.013 | 0.0007 | 3.20 | 5.18 | 27.0 | 0.52 | 0.223 | 0.012 | 0.01V-0.0010REM |
| | 13 | 0.016 | 0.46 | 7.10 | 0.014 | 0.0008 | 3.42 | 4.07 | 27.0 | 1.75 | 0.160 | 0.012 | — |
| Comparative Examples | 14 | 0.016 | 0.49 | 1.52 | 0.011 | 0.0008 | 3.22 | 5.21 | 18.1* | 1.94 | 0.232 | 0.012 | — |
| | 15 | 0.016 | 0.50 | 1.55 | 0.015 | 0.0005 | 2.05 | 5.22 | 20.2 | 1.99 | 0.085* | 0.008 | — |
| | 16 | 0.015 | 0.49 | 4.90 | 0.014 | 0.0005 | 3.10 | 4.04 | 20.1 | 1.03 | 0.224 | 0.019 | — |
| | 17 | 0.015 | 0.48 | 5.08 | 0.015 | 0.0009 | 3.11 | 3.52* | 23.2 | 0.52 | 0.262 | 0.023 | — |
| | 18 | 0.036* | 0.68 | 4.94 | 0.012 | 0.0004 | 2.10 | 1.49* | 24.0 | 0.96 | 0.238 | 0.027 | — |
| | 19 | 0.015 | 0.48 | 1.02 | 0.011 | 0.0001 | 1.90* | 5.08 | 24.2 | 0.52 | 0.231 | 0.028 | — |
| | 20 | 0.015 | 0.50 | 1.03 | 0.011 | 0.0005 | 1.15* | 5.02 | 25.1 | 1.05 | 0.302 | 0.032 | — |
| | 21 | 0.015 | 0.43 | 0.98 | 0.011 | 0.0003 | 2.10 | 5.06 | 25.1 | 0.51 | 0.148 | 0.019 | — |
| | 22 | 0.015 | 0.49 | 1.03 | 0.016 | 0.0006 | 1.21* | 5.08 | 24.8 | 2.11* | 0.185 | 0.020 | — |
| | 23 | 0.016 | 0.50 | 1.01 | 0.013 | 0.0005 | 2.10 | 5.56 | 25.1 | 0.11* | 0.182 | 0.019 | — |
| | 24 | 0.015 | 0.50 | 1.02 | 0.012 | 0.0008 | 2.12 | 6.10 | 26.2 | 0.02* | 0.182 | 0.015 | — |
| | 25 | 0.011 | 0.48 | 1.54 | 0.012 | 0.0009 | 1.55* | 5.12 | 26.7 | 1.04 | 0.155 | 0.020 | — |
| | 26 | 0.014 | 0.49 | 1.56 | 0.015 | 0.0008 | 2.10 | 4.98 | 26.8 | 0.02* | 0.164 | 0.015 | — |
| | 27 | 0.013 | 0.48 | 1.54 | 0.012 | 0.0009 | 2.50 | 5.22 | 26.7 | 1.22 | 0.155 | 0.012 | — |

The contents (mass percents) of the corresponding elements in the steel with each base metal number are shown in the chemical composition section in Table 1. The balance (components other than the elements shown in Table 1) in the chemical composition with each base metal number consists of Fe and impurities. "-" in Table 1 represents that the content of the corresponding element is in an impurity level. Selective elements contained in the corresponding steel are shown in the "Others" section in Table 1. For example, "0.06V-0.0015Ca" in the "Others" section corresponding to the base metal number 5 represents that the V content is 0.06% and that the Ca content is 0.0015%.

The molten duplex stainless steels were cast, whereby ingots were produced. The produced ingots were each heated to 1,250° C. Hot forging was performed on the heated ingots, whereby plate materials each having a thickness of 40 mm were produced. The produced plate materials were heated again to 1,250° C. Hot rolling was performed on the heated plate materials, whereby steel plates each having a thickness of 15 mm were produced. The surface temperature of each steel material at the time of the rolling was 1,050° C. Solution treatment was performed on the produced steel plates. The solution treatment temperature was 1,070° C., and the soaking time was 30 minutes. After the soaking, the steel plates were water-cooled to reach a normal temperature length of 200 mm. Moreover, the plate material had a V-type groove surface 11 on its longer side, and the V-type groove surface 11 had a groove angle of 30°. The plate material 10 was made by machine processing.

Figure 4A:
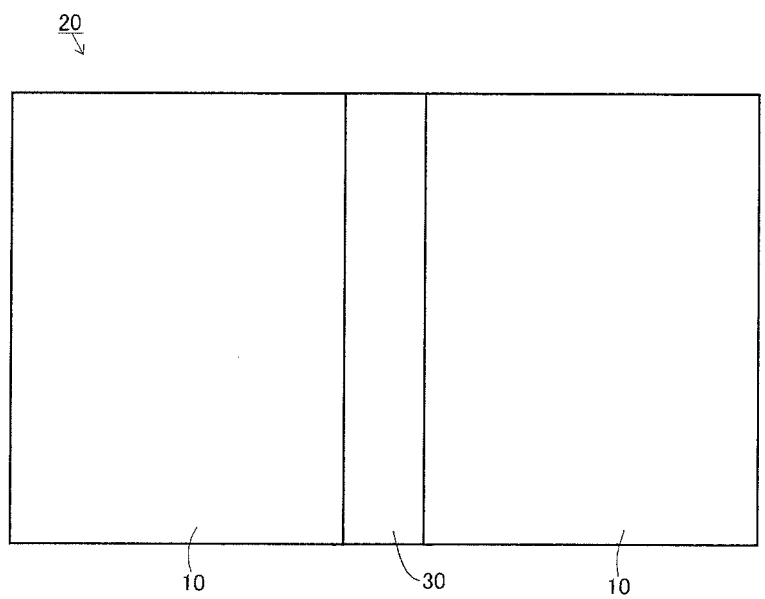
FIG. 4A is a plan view of a welded joint made in Example 1.
Figure 4B:
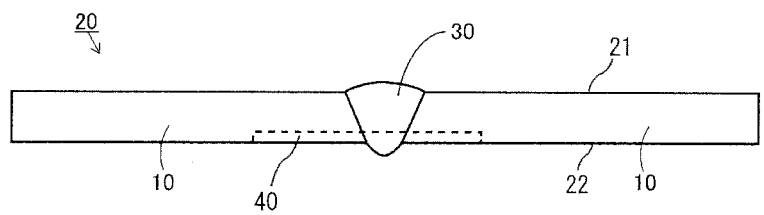
FIG. 4B is a front view of the welded joint illustrated in FIG. 4A.

The V-type groove surfaces 11 of the two made plate materials 10 were placed so as to be opposed to each other. The two plate materials 10 were welded according to tungsten inert gas welding, whereby a welded joint 20 illustrated in FIG. 4A and FIG. 413 was made. FIG. 4A is a plan view of the welded joint 20, and FIG. 4B is a front view thereof. The welded joint 20 had a front surface 21 and a back surface 22, and included a weld metal 30 in its center. The weld metal 30 was formed from the front surface 21 side according to multi-layer welding, and extended in the longer-side direction of the plate materials 10. All the weld metals 30 with their respective base metal numbers were formed using a weld material having the same chemical composition as that of the steel plate under test with the base metal number 1 and having an outer diameter of 2 mm. The heat input in the tungsten inert gas welding was 30 kJ/cm.

Figure 5:
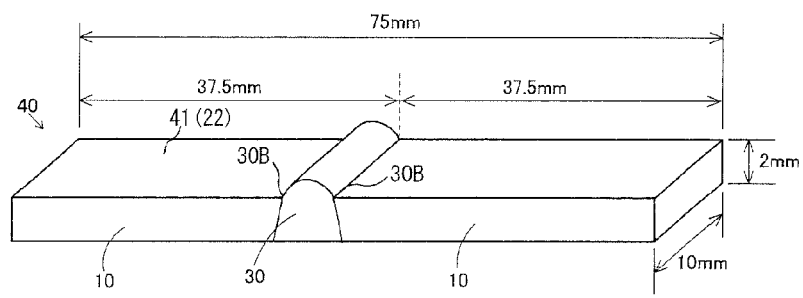
FIG. 5 is a perspective view of a four-point bending specimen collected from the welded joint illustrated in FIG. 4A and FIG. 4B.

A plate-shaped specimen 40 including the weld metal 30 was collected from the back surface 22 side of the welded joint 20. A broken line portion of the welded joint 20 in FIG. 4B shows a portion from which the specimen 40 was collected. FIG. 5 is a perspective view of the collected specimen. In FIG. 5, numerical values with "mm" represent dimensions (the unit is millimeter). With reference to FIG. 5, the specimen 40 had a plate-like shape. An upper surface 41 of the specimen 40 corresponded to the back surface 22 of the welded joint (see FIG. 4B). The longitudinal direction of the specimen 40 was orthogonal to the longitudinal direction of the weld metal 30. As illustrated in FIG. 5, one of two boundary lines 30B between the weld metal 30 and the plate materials 10 was placed in the center of the specimen 40.

[SCC Test]

A four-point bending test was performed using the specimen 40, and the SCC resistance of each material under test was evaluated. An actual yield stress (the yield stress of each material under test) in conformity to ASTM G39 was applied to the specimen 40 using a four-point bending jig. The specimen 40 to which the stress was applied was immersed in a 25%-NaCl aqueous solution (150° C.) into which $CO_2$ was injected at 3 MPa, and the immersed specimen 40 was held for 720 hours without any change. After the elapse of 720 hours, whether or not SCC occurred on a surface of the specimen 40 was visually observed. Moreover, the specimen 40 was cut in a direction perpendicular to the upper surface 41. The cross-section of the specimen 40 was observed using a 500× optical microscope, and whether or not SCC occurred was determined.

[Area Fraction Measurement Test of σ Phase]

The welded joint 20 with each base metal number was cut in a direction perpendicular to the weld line and the front surface 21 thereof. After the cutting, the cross-section of the welded joint 20 was mirror-polished and etched. After the etching, an image of a heat affected zone (HAZ) of the etched cross-section was analyzed using a 500× optical microscope. The area of the HAZ used for the image analysis was 40,000 $\mu m^2$ per visual field. The image analysis was performed for four visual fields. The area fraction (%) of the σ phase in the HAZ for each visual field was obtained through the image analysis. The average of the area fractions of the σ phase for the four visual fields was defined as the area fraction (%) of the σ phase for each base metal number. In the case where the area fraction of the σ phase was equal to or more than 0.5%, it was determined that the σ phase precipitated. In the case where the area fraction of the σ phase was less than 0.5%, it was determined that the σ phase did not precipitate.

[Test Results]

The test results are shown in Table 2.

TABLE 2

| | Base Material Number | F1 | SCC | F2 | σ Phase |
|---|---|---|---|---|---|
| Examples of Present Invention | 1 | 68.75 | Not Found | −11.46 | Not Found |
| | 2 | 71.03 | Not Found | −12.45 | Not Found |
| | 3 | 71.07 | Not Found | −0.15 | Not Found |
| | 4 | 67.18 | Not Found | −8.61 | Not Found |
| | 5 | 72.9 | Not Found | −9.26 | Not Found |
| | 6 | 70.23 | Not Found | −7.99 | Not Found |
| | 7 | 70.11 | Not Found | −25.3 | Not Found |
| | 8 | 70.02 | Not Found | −9.92 | Not Found |
| | 9 | 71.64 | Not Found | −28.26 | Not Found |
| | 10 | 66.98 | Not Found | −23.11 | Not Found |
| | 11 | 69.57 | Not Found | −13.72 | Not Found |
| | 12 | 72.64 | Not Found | −34.16 | Not Found |
| | 13 | 81.91 | Not Found | −11.69 | Not Found |
| Comparative Examples | 14 | 63.06* | Found | −30.62 | Not Found |
| | 15 | 64.52* | Found | 39.09* | Found |
| | 16 | 60.73* | Found | 46.01 | Not Found |

TABLE 2-continued

| Base Material Number | F1 | SCC | F2 | σ Phase |
|---|---|---|---|---|
| 17 | 64.01* | Found | −67.52 | Not Found |
| 18 | 65.82* | Found | −61.42 | Not Found |
| 19 | 62.58* | Found | −25.24 | Not Found |
| 20 | 66.02 | Found | −35.67 | Not Found |
| 21 | 65.09* | Found | 2.83* | Found |
| 22 | 72.96 | Found | 17.69* | Found |
| 23 | 62.29* | Found | −8.81 | Not Found |
| 24 | 64.14* | Found | −3.54 | Not Found |
| 25 | 70.67 | Found | 14.94* | Found |
| 26 | 65.4* | Found | −7.42 | Not Found |
| 27 | 74.78 | Not Found | 6.52* | Found |

An F1 value (F1=2.2Cr+7Mo+3Cu) of the steel plate under test with each base metal number is inputted to the "F1" section in Table 2. "Not Found" in the "SCC" section represents that SCC was not observed in the specimen 40 with the corresponding base metal number. "Found" therein represents that SCC was observed in the specimen 40 with the corresponding base metal number.

An F2 value (F2=Cr+11Mo+10Ni−12(Cu+30N)) of the steel plate under test with each base metal number is inputted to the "F2" section. "Not Found" in the "σ Phase" section represents that the area fraction of the σ phase was less than 1%. "Found" therein represents that the area fraction of the σ phase was equal to or more than 1%.

[Evaluation of SCC Resistance]

With reference to Table 2, the chemical compositions of the steel plates under test with the base metal numbers 1 to 13 fell within the range of the present invention. Moreover, the steel plates under test with the base metal numbers 1 to 13 satisfied Expression (1) and Expression (2). Hence, SCC was not observed in the specimens 40 with the base metal numbers 1 to 13.

In comparison, the steel plates under test with the base metal numbers 14 to 19, 21, 23, 24, and 26 did not satisfy Expression (1). Accordingly, SCC occurred in the specimens 40 with these base metal numbers.

The steel plates under test with the base metal numbers 20, 22, and 25 satisfied Expression (1). However, the Cu contents of the steel plates under test with the base metal numbers 20, 22, and 25 were less than the lower limit of the Cu content according to the present invention. Hence, SCC occurred in the specimens 40 with the base metal numbers 20, 22, and 25.

[Evaluation of σ Phase Precipitation Suppression]

With reference to Table 2, the steel plates under test with the base metal numbers 1 to 14, 16 to 20, 23, 24, and 26 satisfied Expression (2). Hence, the σ phase did not precipitate in the HAZs of the welded joints 20 with these base metal numbers. In comparison, the steel plates under test with the base metal numbers 15, 21, 22, 25, and 27 did not satisfy Expression (2). Hence, the σ phase precipitated in the HAZs of the welded joints 20 with these base metal numbers. In particular, the chemical composition of the steel plate under test with the test number 27 fell within the range of the present invention, and satisfied Expression (1). However, because the steel plate under test with the test number 27 did not satisfy Expression (2), the σ phase precipitated.

EXAMPLE 2

Characteristics (the SCC resistance, the σ phase precipitation suppression, and the toughness) of the weld metal of the welded joint of duplex stainless steel were examined according to the following method.

[Examination Method]

[Making of Specimens]

Figure 6A:
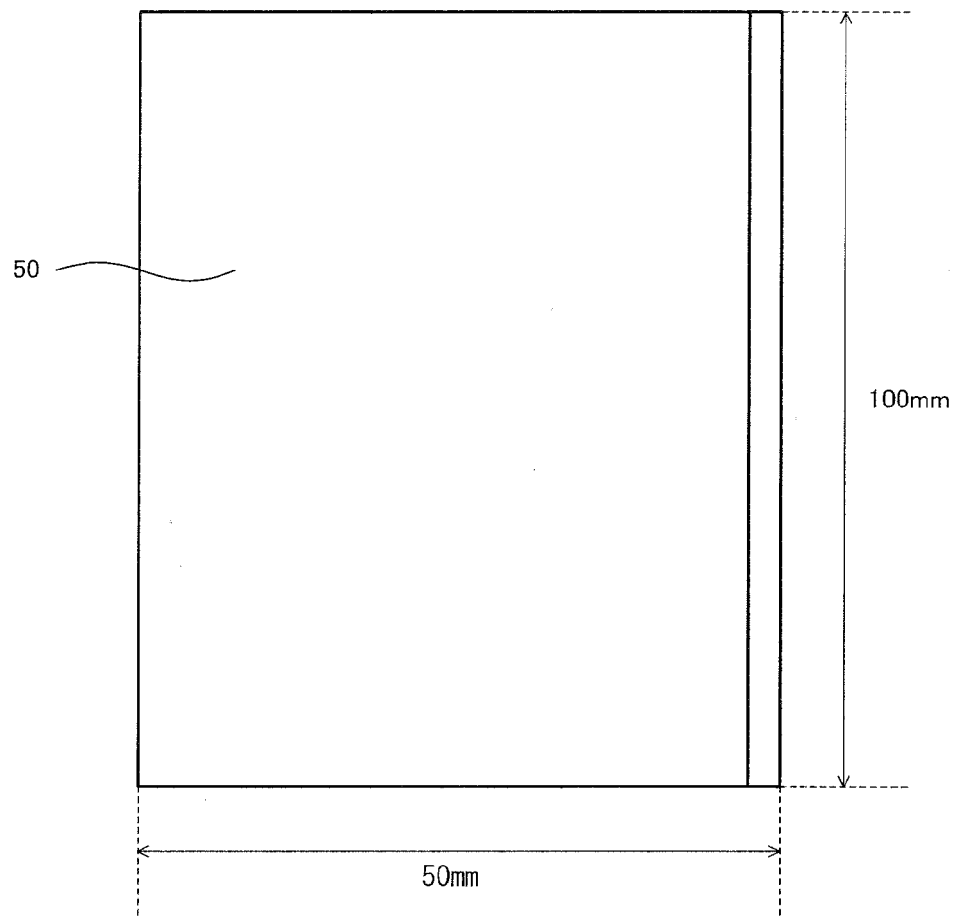
FIG. 6A is a plan view of a plate material made in Example 2.
Figure 6B:
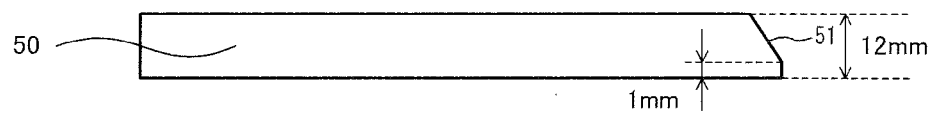
FIG. 6B is a front view of the plate material illustrated in FIG. 6A.

Two plate materials 50 illustrated in FIG. 6A and FIG. 6B were made by machine processing from each of the steel plates under test with the base metal numbers 1 and 8 in Table 1. FIG. 6A is a plan view of the plate material 50, and FIG. 6B is a front view thereof. In FIG. 6A and FIG. 6B, numerical values with "mm" represent dimensions (the unit is millimeter).

The plate material 50 had a thickness of 12 mm, a width of 50 mm, and a length of 100 mm. Moreover, the plate material had a V-type groove surface 51 on its longer side, and the V-type groove surface 51 had a groove angle of 30° and a root thickness of 1 mm.

Figure 7A:
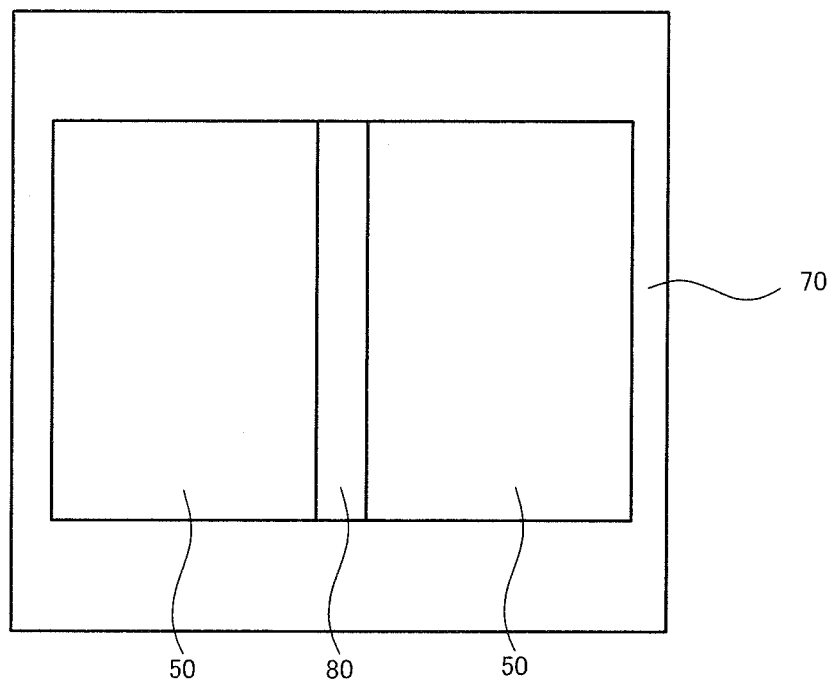
FIG. 7A is a plan view of a welded joint made in Example 2.
Figure 7B:
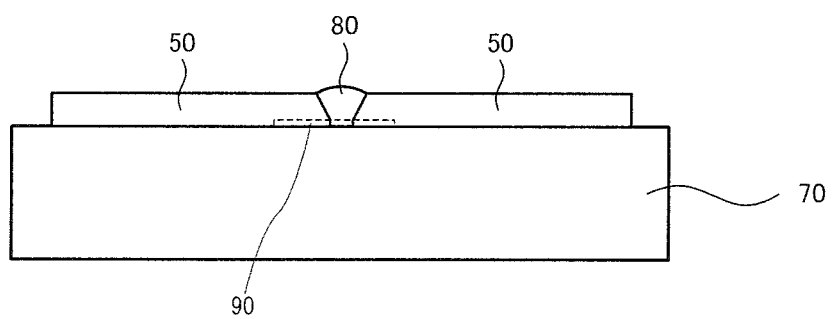
FIG. 7B is a front view of the welded joint illustrated in FIG. 7A.

As illustrated in FIGS. 7A and 7B, a restraint plate 70 was prepared. The restraint plate 70 had a thickness of 25 mm, a width of 200 mm, and a length of 200 mm, and had a chemical composition corresponding to SM400C specified in JIS G 3106 (2004).

The two plate materials 50 were placed on the restraint plate 70. At this time, the groove surfaces 51 of the two plate materials 50 were opposed to each other. After the two plate materials 50 were placed, the peripheries of the plate materials 50 were restraint-welded using a covered electrode. The covered electrode had a chemical composition corresponding to "DNiCrFe-3" specified in JIS Z3224 (1999).

Next, multi-layer arc welding was performed on the grooves of the two plate materials 50, whereby welded joints 60 with joint numbers 1-1 to 1-16 and 8-1 to 8-6 shown in Table 3 were made.

and 8-6. The heat input in each welding was 30 kJ/cm. At the time of the tungsten inert gas welding, 100%-Ar gas was used for the shielding gas. At the time of the metal active gas welding for the joint number 8-5, a gaseous mixture of 80%-Ar gas and 20%-$CO_2$ gas was used for the shielding gas. At the time of the metal active gas welding for the joint number 8-6, a gaseous mixture of 60%-Ar gas and 40%-$CO_2$ gas was used for the shielding gas. Table 3 shows the welding method and the shielding gas for each joint number.

The same weld material was used for the joint numbers 1-1 and 8-1. Similarly, the same weld material was used for the joint numbers 1-2, 8-2, 8-5, and 8-6. The same weld material was used for the joint numbers 1-3 and 8-3. The same weld material was used for the joint numbers 1-4 and 8-4. Each weld material was produced according to the following method. The weld material was molten using a vacuum furnace having a capacity of 30 kg. The molten weld material was cast, whereby an ingot was produced. The produced ingot was heated to 1,250° C. Hot forging was performed on the heated ingot, whereby a plate material having a thickness of 40 mm was produced. The plate material was heated again to 1,250° C. Hot rolling was performed on the heated plate material, whereby a plate material having a thickness of 4 mm was produced. The temperature of the plate material at the time of the rolling was equal to or more than 1,050° C. Machine processing was performed on the produced plate material, whereby a weld material having a square shape whose length of each side was 2 mm was made. Welding according to the above-mentioned welding method was performed using the made weld material, whereby the welded joint 60 with each joint number was obtained.

TABLE 3

| | Joint Number | Base Material Number | Chemical Composition of Weld Metal (the unit is mass percent, and the balance consists of Fe and impurities) | | | | | | | | | | | | Welding Method | Shielding Gas |
|---|---|---|---|---|---|---|---|---|---|---|---|---|---|---|---|---|
| | | | C | Si | Mn | P | S | Cu | Ni | Cr | Mo | N | Sol. Al | O | W | | |
| Examples of Present Invention | 1-1 | 1 | 0.009 | 0.64 | 1.32 | 0.010 | 0.002 | 0.78 | 7.92 | 22.3 | 2.66 | 0.120 | 0.020 | 0.013 | — | TIG | 100% Ar |
| | 1-2 | 1 | 0.009 | 0.42 | 1.67 | 0.008 | 0.003 | 0.35 | 8.43 | 22.0 | 2.87 | 0.108 | 0.006 | 0.009 | — | TIG | 100% Ar |
| | 1-3 | 1 | 0.020 | 0.33 | 0.61 | 0.006 | 0.002 | 0.79 | 9.24 | 24.9 | 2.88 | 0.175 | 0.005 | 0.007 | 1.98 | TIG | 100% Ar |
| | 1-4 | 1 | 0.016 | 0.48 | 1.48 | 0.010 | 0.002 | 0.74 | 8.21 | 22.4 | 2.91 | 0.119 | 0.020 | 0.009 | — | TIG | 100% Ar |
| | 8-1 | 8 | 0.009 | 0.65 | 1.27 | 0.011 | 0.002 | 0.69 | 8.00 | 22.8 | 2.58 | 0.154 | 0.019 | 0.014 | — | TIG | 100% Ar |
| | 8-2 | 8 | 0.005 | 0.41 | 1.57 | 0.013 | 0.002 | 0.32 | 8.21 | 22.2 | 2.75 | 0.103 | 0.005 | 0.011 | — | TIG | 100% Ar |
| | 8-3 | 8 | 0.013 | 0.35 | 0.56 | 0.007 | 0.002 | 0.72 | 8.99 | 25.5 | 2.83 | 0.177 | 0.004 | 0.003 | 1.85 | TIG | 100% Ar |
| | 8-4 | 8 | 0.016 | 0.48 | 1.43 | 0.011 | 0.002 | 0.64 | 8.30 | 22.8 | 2.82 | 0.153 | 0.019 | 0.010 | — | TIG | 100% Ar |
| | 8-5 | 8 | 0.006 | 0.32 | 1.54 | 0.014 | 0.003 | 0.30 | 8.23 | 22.3 | 2.71 | 0.102 | 0.005 | 0.026 | — | MAG | 80% Ar + 20% CO2 |
| Comparative Examples | 1-5 | 1 | 0.013 | 0.48 | 1.49 | 0.010 | 0.002 | 3.40* | 4.22* | 20.2 | 1.99 | 0.121 | 0.020 | 0.008 | — | TIG | 100% Ar |
| | 1-6 | 1 | 0.015 | 0.49 | 1.52 | 0.010 | 0.003 | 2.61* | 4.31* | 20.4 | 2.03 | 0.116 | 0.019 | 0.011 | — | TIG | 100% Ar |
| | 1-7 | 1 | 0.016 | 0.50 | 1.50 | 0.009 | 0.002 | 1.87 | 4.19* | 21.0 | 2.28 | 0.123 | 0.020 | 0.010 | — | TIG | 100% Ar |
| | 1-8 | 1 | 0.015 | 0.50 | 1.51 | 0.011 | 0.002 | 0.74 | 4.18* | 20.8 | 1.98 | 0.118 | 0.018 | 0.010 | — | TIG | 100% Ar |
| | 1-9 | 1 | 0.010 | 0.51 | 1.55 | 0.008 | 0.003 | 0.34 | 5.86* | 22.1 | 2.50 | 0.121 | 0.019 | 0.010 | — | TIG | 100% Ar |
| | 1-10 | 1 | 0.017 | 0.53 | 1.40 | 0.010 | 0.002 | 0.36 | 12.6* | 21.9 | 2.80 | 0.121 | 0.023 | 0.007 | — | TIG | 100% Ar |
| | 1-11 | 1 | 0.015 | 0.50 | 1.79 | 0.009 | 0.003 | 1.09 | 8.21 | 25.8 | 0.92* | 0.120 | 0.021 | 0.008 | — | TIG | 100% Ar |
| | 1-12 | 1 | 0.011 | 0.50 | 1.61 | 0.006 | 0.002 | 0.74 | 8.66 | 21.5 | 4.54* | 0.119 | 0.020 | 0.010 | — | TIG | 100% Ar |
| | 1-13 | 1 | 0.009 | 0.42 | 1.67 | 0.008 | 0.002 | 0.35 | 8.55 | 32.6* | 2.90 | 0.121 | 0.007 | 0.009 | — | TIG | 100% Ar |
| | 1-14 | 1 | 0.012 | 0.60 | 1.65 | 0.008 | 0.002 | 0.35 | 8.21 | 22.3 | 1.98 | 0.114 | 0.018 | 0.008 | — | TIG | 100% Ar |
| | 1-15 | 1 | 0.011 | 0.55 | 1.58 | 0.009 | 0.002 | 0.35 | 8.70 | 24.5 | 3.08 | 0.109 | 0.006 | 0.010 | — | TIG | 100% Ar |
| | 1-16 | 1 | 0.014 | 0.48 | 1.50 | 0.011 | 0.003 | 3.38* | 8.22 | 20.4 | 2.04 | 0.119 | 0.018 | 0.013 | — | TIG | 100% Ar |
| | 8-6 | 8 | 0.005 | 0.31 | 1.54 | 0.013 | 0.002 | 0.31 | 8.21 | 22.3 | 2.69 | 0.118 | 0.005 | 0.039* | — | MAG | 60% Ar + 40% CO2 |

With reference to FIG. 7A and FIG. 7B, the welded joint 60 included the plate materials 50 and the weld metal 80. Table 3 shows the chemical composition of the weld metal 80 with each joint number.

Tungsten inert gas welding was performed for the joint numbers 1-1 to 1-16 and the joint numbers 8-1 to 8-4. Metal active gas welding was performed for the joint numbers 8-5

[High-Temperature Cracking Test]

A specimen for micro-structure observation taken in a cross-section orthogonal to the weld line was collected from the welded joint 60 with each joint number shown in Table 3. A surface of the collected specimen was mirror-polished and etched. The surface of the etched specimen was observed using a 500× optical microscope. Then, whether or not high-temperature cracking occurred in the weld metal 80 was visually determined.

[SCC Test]

Similarly to the specimen 40 used for the SCC test in Example 1, a specimen 90 was collected from the lower surface side of the welded joint 60 illustrated in FIG. 6E. The specimen 90 had the same dimensions and shape as those of the specimen 40 illustrated in FIG. 5. That is, the specimen 90 had a thickness of 2 mm, a width of 10 mm, and a length of 75 mm.

A SCC test was performed using the specimen 90 under the same conditions as those in Example 1, and whether or not SCC occurred in the specimen 90 was determined similarly to the SCC test in Example 1.

[Area Fraction Measurement Test of σ Phase]

Similarly to Example 1, the welded joint 60 with each joint number was cut in a direction perpendicular to the weld line and the front surface thereof. After the cutting, the cross-section of the welded joint 60 was mirror-polished and etched. After the etching, an image of the weld metal 80 in the etched cross-section was analyzed using a 500× optical microscope. The area fraction (%) of the σ phase in the weld metal 80 was obtained through the image analysis. The method of measuring the area fraction of the σ phase was the same as that in Example 1. In the case where the area fraction of the σ phase was equal to or more than 1%, it was determined that the σ phase precipitated. In the case where the area fraction of the σ phase was less than 1%, it was determined that the σ phase did not precipitate.

[Toughness Test]

A V-notch specimen was collected from the welded joint 60 with each joint number. The notch position of the V-notch specimen corresponded to a central portion of the weld metal 80. The V-notch specimen had a width of 10 mm, a thickness of 10 mm, a length of 55 mm, and a notch depth of 2 mm. A Charpy impact test was performed on the V-notch specimen at −30° C. on the basis of JIS Z2242, whereby absorbed energy was obtained.

[Test Results]

The test results are shown in Table 4.

With reference to Table 4, the base metal number of the used plate material 50 is inputted to the "Base metal Number" section. "Not Found" in the "High-Temperature Cracking" section represents that high-temperature cracking was not observed, and "Found" therein represents that high-temperature cracking was observed. Absorbed energy (J) at −30° C. obtained in the above-mentioned Charpy impact test is inputted to "vE-30° C. (J)". The "F1" section, the "SCC" section, the "F2" section, and the "σ phase" section are the same as those in Table 2.

With reference to Table 4, the chemical compositions of the weld metals 80 with the joint numbers 1-1 to 1-4 and 8-1 to 8-5 fell within the range of the present invention, and satisfied Expression (1) and Expression (3). Hence, for these joint numbers, high-temperature cracking and SCC did not occur, and the σ phase was not observed. Moreover, the absorbed energy for these joint numbers was as high as 100 J or more.

In comparison, the Cu contents of the weld metals 80 with the joint numbers 1-5, 1-6, and 1-16 were more than the upper limit of the Cu content of the weld metal according to the present invention. Hence, for these joint numbers, high-temperature cracking occurred.

The Ni contents of the weld metals 80 with the joint numbers 1-5 to 1-9 were less than the lower limit of the Ni content of the weld metal according to the present invention. Hence, for these joint numbers, the absorbed energy was less than 100 J, and the toughness was low.

The Ni content of the weld metal 80 with the joint number 1-10 was more than the upper limit of the Ni content according to the present invention. Hence, the σ phase occurred for the joint number 1-10. The Mo content of the weld metal 80 with the joint number 1-11 was less than the lower limit of the Mo content according to the present invention. Hence, SCC occurred for the joint number 1-11. The Mo content of the weld metal 80 with the joint number 1-12 was more than the upper limit of the Mo content according to the present invention. Hence, the σ phase occurred for the joint number 1-12. The Cr content of the weld metal 80 with the joint number 1-13 was more than the

TABLE 4

| | Joint Number | Base Material Number | High-Temperature Cracking | F1 | SCC | F2 | σPhase | vE-30° C. (J) |
|---|---|---|---|---|---|---|---|---|
| Examples of Present Invention | 1-1 | 1 | Not Found | 70.01 | Not Found | 78.14 | Not Found | 105 |
| | 1-2 | 1 | Not Found | 69.54 | Not Found | 95.02 | Not Found | 115 |
| | 1-3 | 1 | Not Found | 77.27 | Not Found | 76.49 | Not Found | 223 |
| | 1-4 | 1 | Not Found | 71.77 | Not Found | 84.63 | Not Found | 133 |
| | 8-1 | 8 | Not Found | 70.14 | Not Found | 67.46 | Not Found | 172 |
| | 8-2 | 8 | Not Found | 69.05 | Not Found | 93.63 | Not Found | 117 |
| | 8-3 | 8 | Not Found | 78.07 | Not Found | 74.17 | Not Found | 210 |
| | 8-4 | 8 | Not Found | 71.90 | Not Found | 74.06 | Not Found | 156 |
| | 8-5 | 8 | Not Found | 68.93 | Not Found | 94.09 | Not Found | 109 |
| Comparative Examples | 1-5 | 1 | Found | 68.57 | Not Found | −0.17 | Not Found | 68 |
| | 1-6 | 1 | Found | 66.86 | Not Found | 12.75 | Not Found | 55 |
| | 1-7 | 1 | Not Found | 67.80 | Not Found | 21.23 | Not Found | 62 |
| | 1-8 | 1 | Not Found | 61.72* | Found | 32.93 | Not Found | 38 |
| | 1-9 | 1 | Not Found | 67.16 | Not Found | 60.65 | Not Found | 77 |
| | 1-10 | 1 | Not Found | 68.89 | Not Found | 130.44* | Found | 102 |
| | 1-11 | 1 | Not Found | 66.43 | Found | 61.75 | Not Found | 132 |
| | 1-12 | 1 | Not Found | 81.20 | Not Found | 106.06* | Found | 113 |
| | 1-13 | 1 | Not Found | 93.11 | Not Found | 102.38* | Found | 146 |
| | 1-14 | 1 | Not Found | 63.92* | Found | 81.03 | Not Found | 216 |
| | 1-15 | 1 | Not Found | 76.55 | Not Found | 102.05* | Found | 189 |
| | 1-16 | 1 | Found | 69.30 | Not Found | 61.64 | Not Found | 153 |
| | 8-6 | 8 | Not Found | 68.82 | Not Found | 87.79 | Not Found | 40 | upper limit of the Cr content according to the present invention. Hence, the σ phase occurred for the joint number 1-13.

The chemical composition of the weld metal 80 with the joint number 1-14 fell within the range of the chemical composition according to the present invention, and the F2 value thereof satisfied Expression (3). However, the F1 value of the weld metal 80 with the joint number 1-14 did not satisfy Expression (1). Hence, SCC occurred for the joint number 1-14.

The chemical composition of the weld metal 80 with the joint number 1-15 fell within the range of the chemical composition according to the present invention, and the F1 value thereof satisfied Expression (1). However, the F2 value of the weld metal 80 with the joint number 1-15 did not satisfy Expression (3). Hence, the σ phase occurred for the joint number 1-15.

The O content of the weld metal 80 with the joint number 8-6 was more than the upper limit of the O content according to the present invention. Hence, for the joint number 8-6, the toughness was low, and the absorbed energy was less than 100 J.

Hereinabove, the embodiment of the present invention has been described, and the above-mentioned embodiment is given as a mere example for carrying out the present invention. Accordingly, the present invention is not limited to the above-mentioned embodiment, and can be carried out by appropriately modifying the above-mentioned embodiment within a range not departing from the gist thereof.

INDUSTRIAL APPLICABILITY

A welded joint of duplex stainless steel according to the present invention can be widely applied to environments that are required to have a SCC resistance. In particular, a welded joint of duplex stainless steel according to the present invention can be applied to a line pipe provided under chloride environments.

The invention claimed is:

1. A joint of duplex stainless steel comprising:
a base metal; and
a weld metal, wherein
the base metal consists of, in mass percent, C: at most 0.030%, Si: 0.20 to 1.00%, Mn: at most 8.00%, P: at most 0.040%, S: at most 0.0100%, Cu: more than 2.00% and at most 4.00%, Ni: 4.00 to 8.00%, Cr: 20.0 to 30.0%, Mo: 0.50 to 2.00%, N: 0.100 to 0.350%, and sol. Al: at most 0.040%, the balance being Fe and impurities,
the base metal satisfies Expression (1) and Expression (2),
the weld metal contains, in mass percent, C: at most 0.030%, Si: 0.20 to 1.00%, Mn: at most 8.00%, P: at most 0.040%, S: at most 0.010%, Cu: 0.10 to 0.8%, Ni: more than 8.00 and at most 12.00%, Cr: 20.0 to 30.0%, Mo: 1.00 to 4.00%, N: 0.100 to 0.350%, sol. Al: at most 0.040%, O: at most 0.035%, the balance being Fe and impurities, and
the weld metal satisfies Expression (1) and Expression (3):

$$2.2Cr+7Mo+3Cu>66 \tag{1}$$

$$Cr+11Mo+10Ni-12(Cu+30N)<0 \tag{2}$$

$$Cr+11Mo+10Ni-12(Cu+30N)<100 \tag{3}$$

where a content (mass percent) of each element in one of the base metal and the weld metal is substituted into a symbol of each element in Expression (1) to Expression (3), wherein the joint has an area fraction of a sigma phase, which is less than 1%.

2. The joint of duplex stainless steel according to claim 1, wherein
the weld metal further contains W: at most 4.00%, instead of part of the Fe.

3. The joint of duplex stainless steel according to claim 2, wherein the Mo content of the base metal is 1.10 to 2.00%.

4. The joint of duplex stainless steel according to claim 1, wherein the Mo content of the base metal is 1.10 to 2.00%.

5. A joint of duplex stainless steel comprising:
a base metal; and
a weld metal, wherein
the base metal consists of, in mass percent, C: at most 0.030%, Si: 0.20 to 1.00%, Mn: at most 8.00%, P: at most 0.040%, S: at most 0.0100%, Cu: more than 2.00% and at most 4.00%, Ni: 4.00 to 8.00%, Cr: 20.0 to 30.0%, Mo: 0.50 to 2.00%, N: 0.100 to 0.350%, and sol. Al: at most 0.040%, the balance being Fe and impurities,
the base metal satisfies Expression (1) and Expression (2),
the weld metal contains, in mass percent, C: at most 0.030%, Si: 0.20 to 1.00%, Mn: at most 8.00%, P: at most 0.040%, S: at most 0.010%, Cu: 0.10 to 0.8%, Ni: more than 8.00 and at most 12.00%, Cr: 20.0 to 30.0%, Mo: 1.00 to 4.00%, N: 100 to 0.350%, sol. Al: at most 0.040%, O: at most 0.035%, and V at most 1.50%, the balance being Fe and impurities, and
the weld metal satisfies Expression (1) and Expression (3):

$$2.2Cr+7Mo+3Cu>66 \tag{1}$$

$$Cr+11Mo+10Ni-12(Cu+30N)<0 \tag{2}$$

$$Cr+11Mo+10Ni-12(Cu+30N)<100 \tag{3}$$

where a content (mass percent) of each element in one of the base metal and the weld metal is substituted into a symbol of each element in Expression (1) to Expression (3), wherein the joint has an area fraction of a sigma phase, which is less than 1%.

6. The joint of duplex stainless steel according to claim 5, wherein
the weld metal further contains W: at most 4.00%, instead of part of the Fe.

7. The joint of duplex stainless steel according to claim 6, wherein the Mo content of the base metal is 1.10 to 2.00%.

8. The joint of duplex stainless steel according to claim 5, wherein the Mo content of the base metal is 1.10 to 2.00%.

9. A joint of duplex stainless steel comprising:
a base metal; and
a weld metal, wherein
the base metal consists of, in mass percent, C: at most 0.030%, Si: 0.20 to 1.00%, Mn: at most 8.00%, P: at most 0.040%, S: at most 0.0100%, Cu: more than 2.00% and at most 4.00%, Ni: 4.00 to 8.00%, Cr: 20.0 to 30.0%, Mo: 0.50 to 2.00%, N: 0.100 to 0.350%, and sol. Al: at most 0.040%, the balance being Fe and impurities,
the base metal satisfies Expression (1) and Expression (2),
the weld metal contains, in mass percent, C: at most 0.030%, Si: 0.20 to 1.00%, Mn: at most 8.00%, P: at most 0.040%, S: at most 0.010%, Cu: 0.10 to 0.8%, Ni: more than 8.00 and at most 12.00%, Cr: 20.0 to 30.0%, Mo: 1.00 to 4.00%, N: 0.100 to 0.350%, sol. Al: at most 0.040%, O: at most 0.035%, and at least one type selected from the group consisting of Ca: at most 0.0200%, Mg: at most 0.0200%, and B: at most 0.0200%, the balance being Fe and impurities, and the weld metal satisfies Expression (1) and Expression (3):

$$2.2Cr+7Mo+3Cu>66 \quad (1)$$

$$Cr+11Mo+10Ni-12(Cu+30N)<0 \quad (2)$$

$$Cr+11Mo+10Ni-12(Cu+30N)<100 \quad (3)$$

where a content (mass percent) of each element in one of the base metal and the weld metal is substituted into a symbol of each element in Expression (1) to Expression (3), wherein the joint has an area fraction of a sigma phase, which is less than 1%.

10. The joint of duplex stainless steel according to claim 9, wherein
the weld metal further contains W: at most 4.00%, instead of part of the Fe.

11. The joint of duplex stainless steel according to claim 10, wherein the Mo content of the base metal is 1.10 to 2.00%.

12. The joint of duplex stainless steel according to claim 9, wherein the Mo content of the base metal is 1.10 to 2.00%.

13. A joint of duplex stainless steel comprising:
a base metal; and
a weld metal, wherein
the base metal consists of, in mass percent, C: at most 0.030%, Si: 0.20 to 1.00%, Mn: at most 8.00%, P: at most 0.040%, S: at most 0.0100%, Cu: more than 2.00% and at most 4.00%, Ni: 4.00 to 8.00%, Cr: 20.0 to 30.0%, Mo: 0.50 to 2.00%, N: 0.100 to 0.350%, and sol. Al: at most 0.040%, the balance being Fe and impurities,
the base metal satisfies Expression (1) and Expression (2),
the weld metal contains, in mass percent, C: at most 0.030%, Si: 0.20 to 1.00%, Mn: at most 8.00%, P: at most 0.040%, S: at most 0.010%, Cu: 0.10 to 0.8%, Ni: more than 8.00 and at most 12.00%, Cr: 20.0 to 30.0%, Mo: 1.00 to 4.00%, N: 0.100 to 0.350%, sol. Al: at most 0.040%, O: at most 0.035%, and rare earth metal: at most 0.2000%, the balance being Fe and impurities, and
the weld metal satisfies Expression (1 ) and Expression (3 ):

$$2.2Cr+7Mo+3Cu>66 \quad (1)$$

$$Cr+11Mo+10Ni-12(Cu+30N)<0 \quad (2)$$

$$Cr+11Mo+10Ni-12(Cu+30N)<100 \quad (3)$$

where a content (mass percent) of each element in one of the base metal and the weld metal is substituted into a symbol of each element in Expression (1) to Expression (3), wherein the joint has an area fraction of a sigma phase, which is less than 1%.

14. The joint of duplex stainless steel according to claim 13, wherein
the weld metal further contains W: at most 4.00%, instead of part of the Fe.

15. The joint of duplex stainless steel according to claim 14, wherein the Mo content of the base metal is 1.10 to 2.00%.

16. The joint of duplex stainless steel according to claim 13, wherein the Mo content of the base metal is 1.10 to 2.00%.

17. A joint of duplex stainless steel comprising:
a base metal; and
a weld metal, wherein
the base metal consists of, in mass percent, C: at most 0.030%, Si: 0.20 to 1.00%, Mn: at most 8.00%, P: at most 0.040%, S: at most 0.0100%, Cu: more than 2.00% and at most 4.00%, Ni: 4.00 to 8.00%, Cr: 20.0 to 30.0%, Mo: 0.50 to 2.00%, N: 0.100 to 0.350%, and sol. Al: at most 0.040%, the balance being Fe and impurities,
the base metal satisfies Expression (1) and Expression (2),
the weld metal contains, in mass percent, C: at most 0.030%, Si: 0.20 to 1.00%, Mn: at most 8.00%, P: at most 0.040%, S: at most 0.010%, Cu: 0.10 to 0.8%, Ni: more than 8.00 and at most 12.00%, Cr: 20.0 to 30.0%, Mo: 1.00 to 4.00%, N: 0.100 to 0.350%, sol. Al: at most 0.040%, O: at most 0.035%, V: at most 1.50%, instead of part of the Fe, and at least one type selected from the group consisting of Ca: at most 0.0200%, Mg: at most 0.0200%, and B: at most 0.0200%, the balance being Fe and impurities, and
the weld metal satisfies Expression (1 ) and Expression (3 ):

$$2.2Cr+7Mo+3Cu>66 \quad (1)$$

$$Cr+11Mo+10Ni-12(Cu+30N)<0 \quad (2)$$

$$Cr+11Mo+10Ni-12(Cu+30N)<100 \quad (3)$$

where a content (mass percent) of each element in one of the base metal and the weld metal is substituted into a symbol of each element in Expression (1) to Expression (3), wherein the joint has an area fraction of a sigma phase, which is less than 1%.

18. The joint of duplex stainless steel according to claim 17, wherein
the weld metal further contains W: at most 4.00%, instead of part of the Fe.

19. The joint of duplex stainless steel according to claim 18, wherein the Mo content of the base metal is 1.10 to 2.00%.

20. The joint of duplex stainless steel according to claim 17, wherein the Mo content of the base metal is 1.10 to 2.00%.

21. A joint of duplex stainless steel comprising:
a base metal; and
a weld metal, wherein
the base metal consists of, in mass percent, C: at most 0.030%, Si: 0.20 to 1.00%, Mn: at most 8.00%, P: at most 0.040%, S: at most 0.0100%, Cu: more than 2.00% and at most 4.00%, Ni: 4.00 to 8.00%, Cr: 20.0 to 30.0%, Mo: 0.50 to 2.00%, N: 0.100 to 0.350%, and sol. Al: at most 0.040%, the balance being Fe and impurities,
the base metal satisfies Expression (1) and Expression (2),
the weld metal contains, in mass percent, C: at most 0.030%, Si: 0.20 to 1.00%, Mn: at most 8.00%, P: at most 0.040%, S: at most 0.010%, Cu: 0.10 to 0.8%, Ni: more than 8.00 and at most 12.00%, Cr: 20.0 to 30.0%, Mo: 1.00 to 4.00%, N: 0.100 to 0.350%, sol. Al: at most 0.040%, O: at most 0.035%, V: at most 1.50%, instead of part of the Fe, and rare earth metal: at most 0.2000%, the balance being Fe and impurities, and the weld metal satisfies Expression (1) and Expression (3):

$$2.2Cr+7Mo+3Cu>66 \quad (1)$$

$$Cr+11Mo+10Ni-12(Cu+30N)<0 \quad (2)$$

$$Cr+11Mo+10Ni-12(Cu+30N)<100 \quad (3)$$

where a content (mass percent) of each element in one of the base metal and the weld metal is substituted into a symbol of each element in Expression (1) to Expression (3), wherein the joint has an area fraction of a sigma phase, which is less than 1%.

22. The joint of duplex stainless steel according to claim 21, wherein
the weld metal further contains W: at most 4.00%, instead of part of the Fe.

23. The joint of duplex stainless steel according to claim 22, wherein the Mo content of the base metal is 1.10 to 2.00%.

24. The joint of duplex stainless steel according to claim 21, wherein the Mo content of the base metal is 1.10 to 2.00%.

25. A joint of duplex stainless steel comprising:
a base metal; and
a weld metal, wherein
the base metal consists of, in mass percent, C: at most 0.030%, Si: 0.20 to 1.00%, Mn: at most 8.00%, P: at most 0.040%, S: at most 0.0100%, Cu: more than 2.00% and at most 4.00%, Ni: 4.00 to 8.00%, Cr: 20.0 to 30.0%, Mo: 0.50 to 2.00%, N: 0.100 to 0.350%, and sol. Al: at most 0.040%, the balance being Fe and impurities,
the base metal satisfies Expression (1) and Expression (2),
the weld metal contains, in mass percent, C: at most 0.030%, Si: 0.20 to 1.00%, Mn: at most 8.00%, P: at most 0.040%, S: at most 0.010%, Cu: 0.10 to 0.8%, Ni: more than 8.00 and at most 12.00%, Cr: 20.0 to 30.0%, Mo: 1.00 to 4.00%, N: 0.100 to 0.350%, sol. Al: at most 0.040%, O: at most 0.035%, V: at most 1.50%, instead of part of the Fe, rare earth metal: at most 0.2000%, instead of part of the Fe, and at least one type selected from the group consisting of Ca: at most 0.0200%, Mg: at most 0.0200%, and B: at most 0.0200%, the balance being Fe and impurities, and
the weld metal satisfies Expression (1) and Expression (3):

$$2.2Cr+7Mo+3Cu>66 \quad (1)$$

$$Cr+11Mo+10Ni-12(Cu+30N)<0 \quad (2)$$

$$Cr+11Mo+10Ni-12(Cu+30N)<100 \quad (3)$$

where a content (mass percent) of each element in one of the base metal and the weld metal is substituted into a symbol of each element in Expression (1) to Expression (3), wherein the joint has an area fraction of a sigma phase, which is less than 1%.

26. The joint of duplex stainless steel according to claim 25, wherein
the weld metal further contains W: at most 4.00%, instead of part of the Fe.

27. The joint of duplex stainless steel according to claim 26, wherein the Mo content of the base metal is 1.10 to 2.00%.

28. The joint of duplex stainless steel according to claim 25, wherein the Mo content of the base metal is 1.10 to 2.00%.

29. A joint of duplex stainless steel comprising:
a base metal; and
a weld metal, wherein
the base metal consists of, in mass percent, C: at most 0.030%, Si: 0.20 to 1.00%, Mn: at most 8.00%, P: at most 0.040%, S: at most 0.0100%, Cu: more than 2.00% and at most 4.00%, Ni: 4.00 to 8.00%, Cr: 20.0 to 30.0%, Mo: 0.50 to 2.00%, N: 0.100 to 0.350%, and sol. Al: at most 0.040%, the balance being Fe and impurities,
the base metal satisfies Expression (1) and Expression (2),
the weld metal contains, in mass percent, C: at most 0.030%, Si: 0.20 to 1.00%, Mn: at most 8.00%, P: at most 0.040%, S: at most 0.010%, Cu: 0.10 to 0.8%, Ni: more than 8.00 and at most 12.00%, Cr: 20.0 to 30.0%, Mo: 1.00 to 4.00%, N: 0.100 to 0.350%, sol. Al: at most 0.040%, O: at most 0.035%, rare earth metal: at most 0.2000%, instead of part of the Fe, and at least one type selected from the group consisting of Ca: at most 0.0200%, Mg: at most 0.0200%, and B: at most 0.0200%, the balance being Fe and impurities, and
the weld metal satisfies Expression (1) and Expression (3):

$$2.2Cr+7Mo+3Cu>66 \quad (1)$$

$$Cr+11Mo+10Ni-12(Cu+30N)<0 \quad (2)$$

$$Cr+11Mo+10Ni-12(Cu+30N)<100 \quad (3)$$

where a content (mass percent) of each element in one of the base metal and the weld metal is substituted into a symbol of each element in Expression (1) to Expression (3), wherein the joint has an area fraction of a sigma phase, which is less than 1%.

30. The joint of duplex stainless steel according to claim 29, wherein
the weld metal further contains W: at most 4.00%, instead of part of the Fe.

31. The joint of duplex stainless steel according to claim 30, wherein the Mo content of the base metal is 1.10 to 2.00%.

32. The joint of duplex stainless steel according to claim 29, wherein the Mo content of the base metal is 1.10 to 2.00%.

* * * * *